J. H. O'HARA.
CORN HUSKING AND SILKING MACHINE.
APPLICATION FILED FEB. 11, 1911.
1,015,740.
Patented Jan. 23, 1912.
4 SHEETS—SHEET 1.
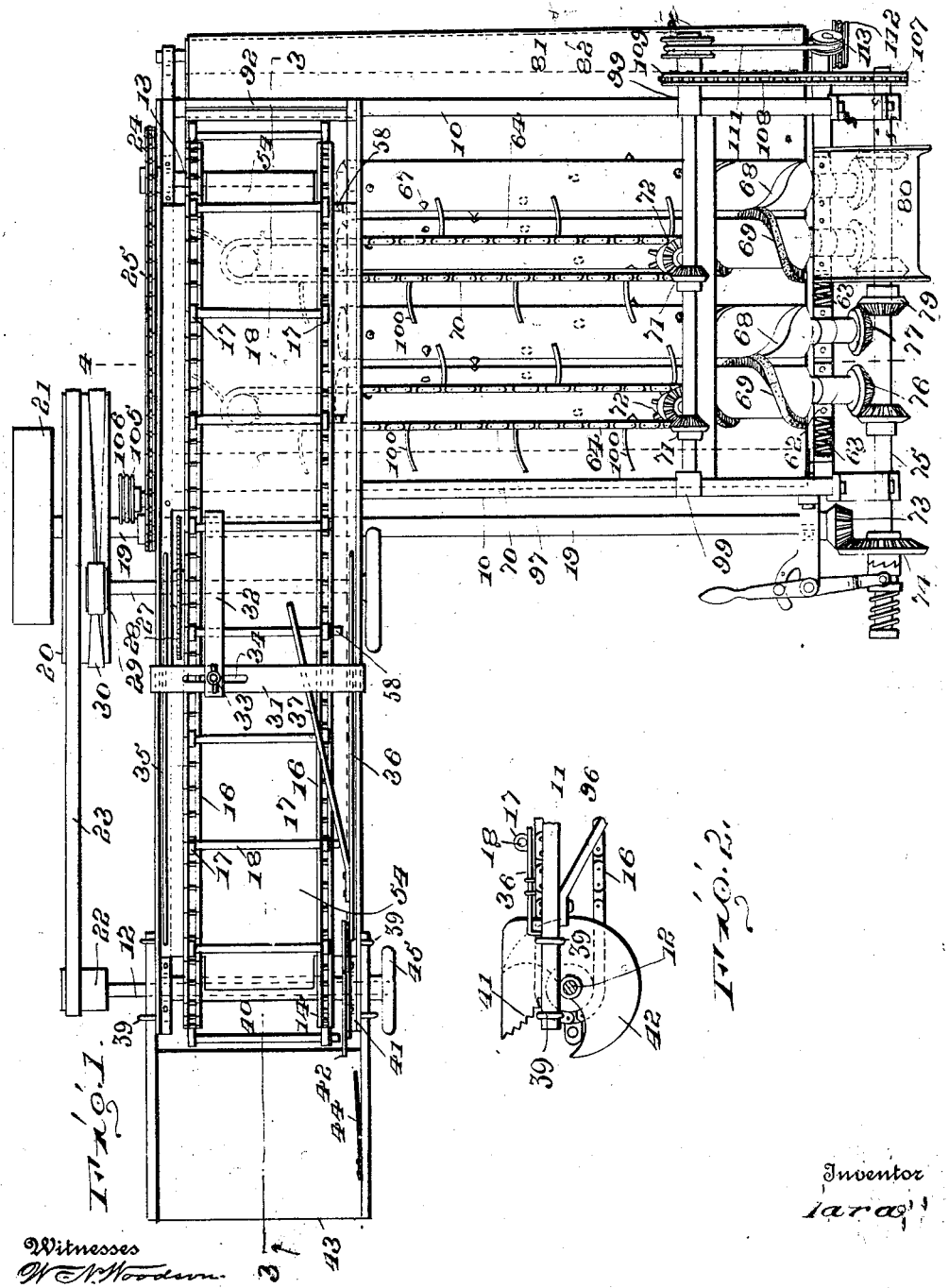

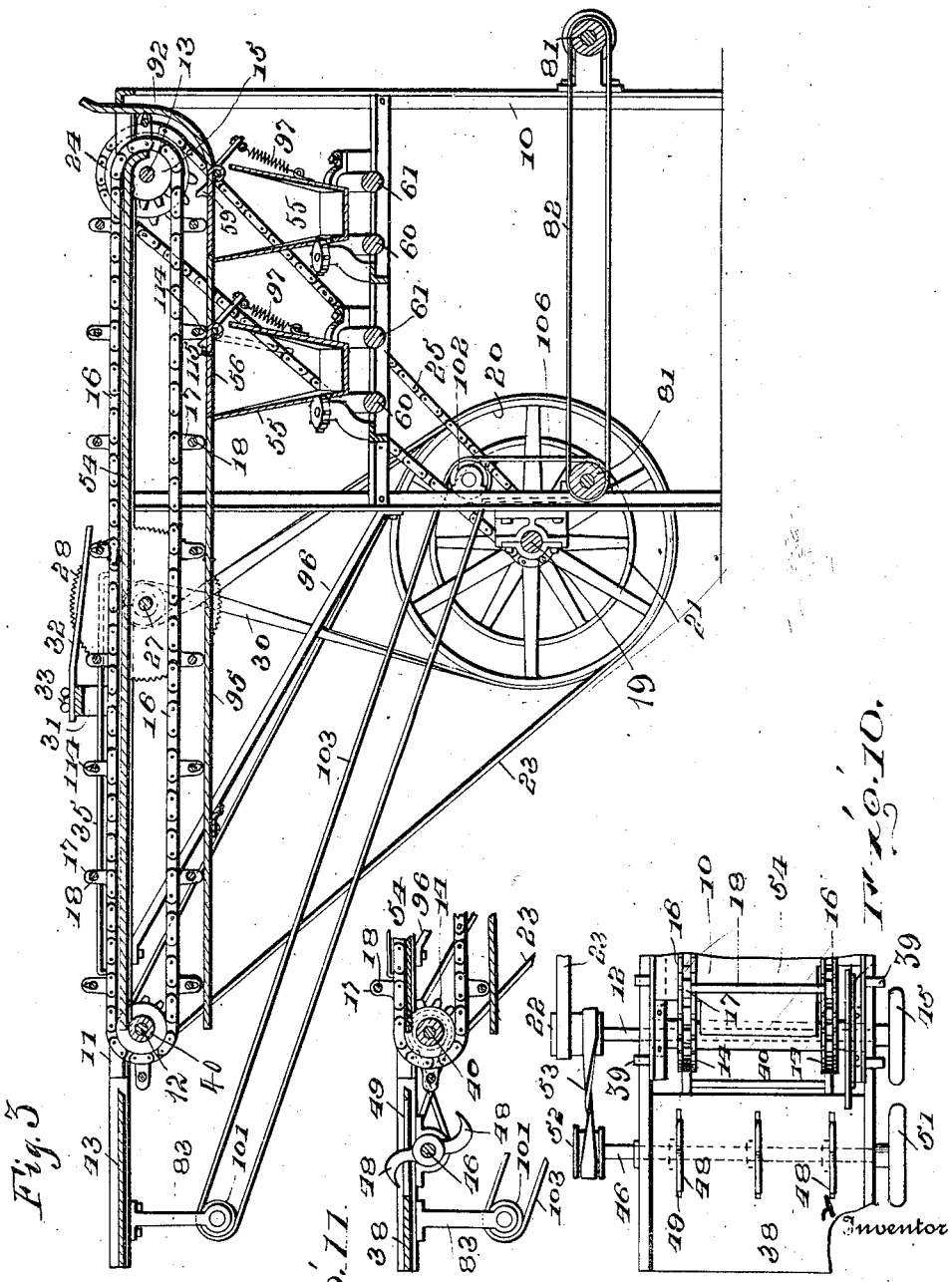

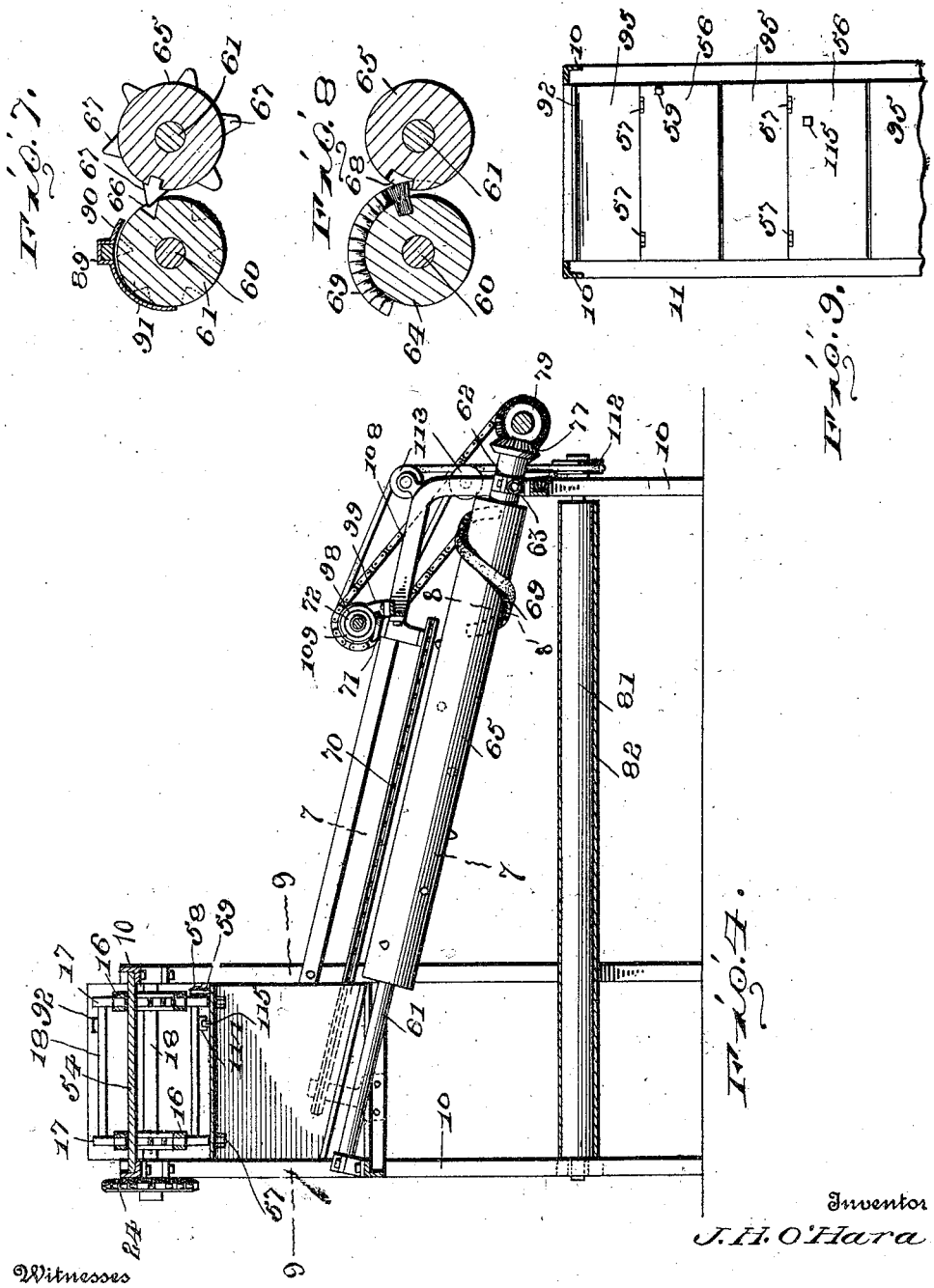

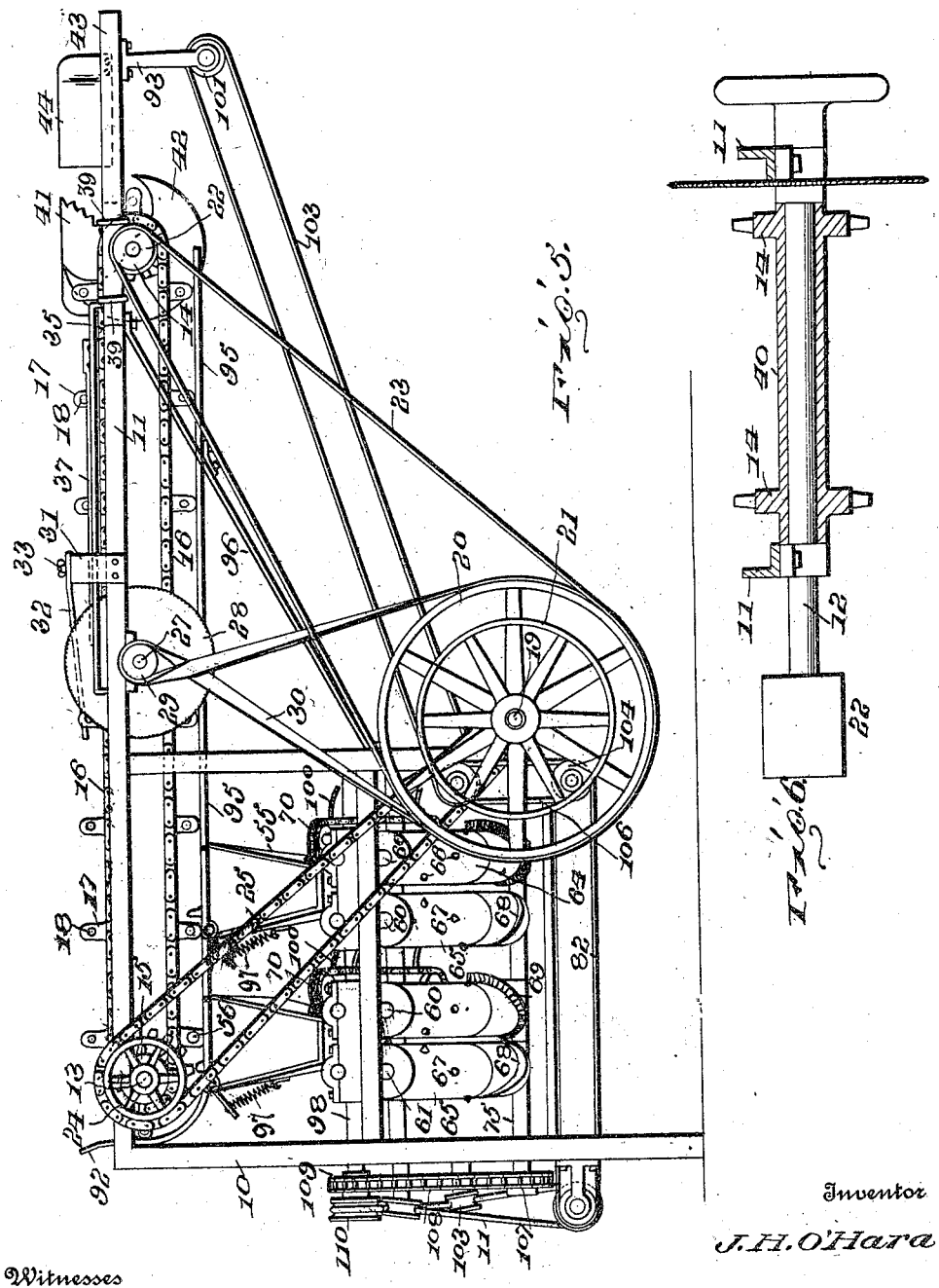

UNITED STATES PATENT OFFICE.

JOHN H. O'HARA, OF ITHACA, NEW YORK.

CORN HUSKING AND SILKING MACHINE.

1,015,740.  Specification of Letters Patent.  Patented Jan. 23, 1912.

Application filed February 11, 1911. Serial No. 608,070.

*To all whom it may concern:*

Be it known that I, JOHN H. O'HARA, citizen of the United States, residing at Ithaca, in the county of Tompkins and State of New York, have invented certain new and useful Improvements in Corn Husking and Silking Machines, of which the following is a specification.

This invention relates to machines for removing the husks and the silk from green corn prior to its removal from the cob in canning operations, and has for one of its objects to improve the construction and increase the efficiency and utility of devices of this character.

Another object of the invention is to provide a simply constructed device whereby the ears of corn are relieved of the surplus husk at the silk end of the ear together with the major portion of the silk, severing the butt end of the ears including the butt ends of the husks, shredding the ears of their husks and relieving the ears of the remaining "silk."

Another object of the invention is to provide an apparatus which may be employed for shucking or removing the ears from the stalks, husking the severed ears, and removing the silk therefrom, or for simply "husking" and "silking" them, as may be required.

With these and other objects in view the invention consists in certain novel features of construction as hereinafter shown and described and then specifically pointed out in the claims.

The "husking" or stripping portion of the improved apparatus is in the form of an attachment which may readily be applied when required, so that the improved device may be quickly arranged for use in the field or in the cannery, as may be required, and without making any change in the husking and silking portions of the apparatus.

The improved apparatus, as above stated, may be employed for removing the husks and "silk" after the ears have been removed from the stalks or for first shucking and removing the ears from the stalks, preferably in the field where the corn is gathered, and then husking and silking the severed ears, and may be arranged with one or more silk-removing portions.

For the purpose of illustration the apparatus is shown arranged with the "shucking" mechanism attached and with two independent sets of husk and silk removing mechanisms, but it will be understood that any required number of the husking and silking portions of the device may be employed in each machine.

In the drawings illustrative of the preferred embodiment of the invention, Figure 1 is a plan view of the improved apparatus complete or arranged for employment in a canning establishment; Fig. 2 is a sectional detail of the silk end cutting device, with the table and fly wheel removed; Fig. 3 is a section on the line 3—3 of Fig. 1, looking in the direction of the arrow; Fig. 4 is a transverse section on the line 4—4 of Fig. 1; Fig. 5 is a side elevation from the drive side; Fig. 6 is an enlarged sectional detail of the silk end cutting mechanism; Fig. 7 is an enlarged section of the stripping rolls on the line 7—7 of Fig. 4; Fig. 8 is an enlarged section of the silking portion of the rolls on the line 8—8 of Fig. 4; Fig. 9 is a sectional detail on the line 9—9 of Fig. 4; illustrating the arrangement of the trap door devices; Fig. 10 is a plan view of the feed end, illustrating the construction of the stalk cutting attachment; and Fig. 11 is a section on the line 10—10 of Fig. 10.

Corresponding and like parts are referred to in the following description and indicated in all the views of the accompanying drawings by the same reference characters.

The improved device comprises a main supporting frame, represented as a whole at 10, and constructed of any suitable material and any suitable size, but is preferably formed of metal and as light as possible consistent with the strains to which it will be subjected. At its rear upper part the frame 10 is provided with a lateral extension 11 carrying a shaft 12 at its outer end, while a similar shaft 13 is carried by the main frame at its rear upper part. The shaft 12 is provided with a hollow shaft or sleeve 40 carrying chain pulleys 14, while the shaft 13 is provided with chain pulleys 15, the two sets of pulleys carrying endless chains 16. The links of the chains are provided at intervals with lugs or projections 17 connected by cross rods 18, the whole constituting an endless carrier to feed the ears of corn to the severing mechanism, as hereinafter described. Mounted for rotation upon the frame 10 near its lower part is a main drive shaft 19 carrying a belt pulley 20. The shaft 19 is rotated in any suitable manner, but for the purpose of illustration is shown provided with a drive puley 21 which will be actuated by any suitable power. The shaft 13 is provided with a chain wheel 24 rearwardly of the frame 10 and over which an endless chain 25 leads from a chain wheel 26 on the main drive shaft 19. By this means the motion of the shaft 19 is imparted to the drive belt at a reduced speed. Mounted for rotation upon the extension frame 11 is another shaft 27 which carries a saw-like cutting blade 28 operative inside the frame extension 11 and provided at its outer end with a belt pulley 29, over which an endless belt 30 leads from the pulley 20, as shown.

Connected to the side members of the frame extension 11 is a transverse bar or member 31 which serves both as a guard to the saw and as a support for a spring plate 32, the latter being located above the carrier and serving to hold the ears of corn as they are passed by the endless belt to the cutting member 28 and to prevent their vertical displacement, as hereafter explained. The spring 32 is connected adjustably to the support 31 by a clamp screw 33 operating in a slot 34 in the member 31. By this means the spring may be adjusted to correspond to the lengths and sizes of the ears of corn.

Connected to the side members of the frame extension 11 and above the carrier are guard rods 35—36, which serve to prevent the longitudinal displacement of the ears of corn. Connected to the guard 36 is a resilient plate 37 which extends obliquely of the line of movement of the endless carrier, and operates as a "butter" to control the movements of the ears of corn, and to adjust the device to ears of different lengths, so that the ears are fed uniformly to the cutting member 28, as hereafter explained.

The shaft 12 is provided with a belt pulley 22 over which a belt 23 leads from the drive pulley 20, the pulley 20 being wide enough to carry both belts 23—30. Connected to the extension frame 11 is a cutting blade 41 having an inclined serrated cutting edge, and mounted for rotation upon the shaft 12 is a rotary cutting member 42 whose cutting edge operates over the stationary cutting edge 41. The cutting members 41—42 are located adjacent to the chain wheels 14 of the sleeve 40, and detachably mounted upon the frame extension 11 by keepers 39 is a platform 43 which supports the ears in position to be acted upon by the cutter devices 41—42 to sever the surplus portion of the husks at the silk end and likewise to sever the major portion of the silk prior to the action of the severing blade 28. Connected to the platform 43 is an adjustable and yieldable deflecting plate 44 which serves to bend the loose surplus portion of the husks over the ends of the ear to bring them in position to be acted upon more completely by the severing devices 41—42. A fly-wheel 45 is connected to the shaft 12 to assist in the operation and to insure the steadiness of action of the cutting member 42. When the improved device is employed in a field, or for shucking the corn prior to the husking and silking operations, the platform 43 is detached and another platform 38 is detachably connected to the frame extension 11 by the same keepers 39. The construction and arrangement of this latter platform is shown in Figs. 9 and 10. Mounted for rotation in the platform 38 is another shaft 46 carrying a plurality of hooked teeth or blades 48 which operate through slots 49 in the platform. The shaft 46 is so arranged that when revolved the teeth 48 pass upwardly through the slots, the sides of the slots serving as shear plates to the blades. By this means an effectual cutting device is produced which serves to sever the stalks at short intervals and release the ears, while at the same time cutting the stalks into short lengths preliminary to feeding or packing in silos, or for like purposes. The shaft 46 is preferably provided with a fly-wheel 51 to insure steadiness of motion, and likewise provided with a belt pulley 52 from which a belt 53 leads from the pulley 22 on the shaft 12, so that motion is imparted to the stalk severing and shucking mechanism.

Connected to the frame 10 and its extension 11 is a table 54 over which the carriers 17 operate and which supports the ears of corn during their forward movement. A platform 95 is located beneath the carrier chains 16 and suitably supported from the frame 10—11 by a brace 96, and with which the lugs 17 engage and which thus supports the under rims of the chains. The upper ends of the husking mechanisms are located beneath the platform 95 and a hopper 55 is arranged above each of the husking mechanisms at their feed ends, and in the drawings two of the husking mechanisms are shown, and consequently two of the hoppers are also shown. Each hopper 55 is provided at its upper end with a closure 56 which is hingedly connected at one side at 57 so that the closure may be tilted downwardly into the hopper. The closure 56 of the hoppers are arranged to be tilted at certain predetermined intervals to permit the corn to be fed by the carrier into the hoppers, and where two sets of the husking mechanisms are employed the ears will be deposited alternately in the hoppers, and where three of the husking mechanisms are employed each hopper will be arranged to receive each third ear and so on, as will be obvious, so that each husking mechanism receives the same number of ears as the operation proceeds.

Each alternate rod 18 is projected at one end, as shown at 58, to engage with a projection 59 on one of the closures 56, while every other alternate rod 18 is provided with a projection 114 to engage with another projection 115 on the other door 56, the projections 59 and 115 being out of alinement so that the projections 58 will not engage the projections 115, while the projections 114 will not engage the projection 59. Thus the projections 58 trip each alternate closure, while the projections 114 trip the other alternate closures. By this means each alternate ear only is deposited in the first hopper, and the remaining alternate ears deposited in the second hopper. The closures 56 will be provided with springs 97 of sufficient strength to maintain them against the weight of the ears of corn as they are passed over, but will yield to the pressure applied to the projections 58—59, and will then be restored automatically to their closed position by the springs.

The husking or stripping mechanisms are precisely alike, and the description of one will suffice for both. Each husking mechanism comprises two main shafts 60—61 mounted for rotation in inclined position upon the frame 10 in suitable bearings, with the bearings 62 for the shaft 60 provided with yieldable means such as springs 63, so that the shafts are maintained in yieldable relations. The shaft 60 is provided with a drum 64, while the shaft 61 is provided with a similar drum 65. The drum 64 is provided with a series of sockets 66 arranged spirally, while the drum 65 is provided with projecting studs or spurs 67 likewise arranged spirally and adapted to consecutively enter the sockets, each of the sockets being provided with its corresponding spur, so that as the two drums are rotated toward each other the spurs consecutively enter the sockets. The sockets are so arranged that the spurs roll through the sockets without undue friction. The sockets 66 terminate at their upper ends forwardly of the carrier, and the spurs nearest the upper end are relatively sharp and are gradually formed with rounded or dulled terminals toward the lower series of spurs. The lower portion of the drum 65 is provided with a plurality of spirally arranged grooves or channels 68 and the drum 65 is provided with correspondingly arranged brushes 69 which are adapted to enter the grooves 68 as the drums are rotated toward each other.

Mounted for rotation alongside of and partly over each roller 64 is an endless chain 70 which is arranged to be rotated through bevel gears 71—72 from a shaft 98 which is supported by suitable brackets 99 from the frame 10. The chains 70 are provided with fingers 100 which operate through the hoppers 55, each hopper being provided with one of the chains and over the space between each pair of the rolls, so that as the ear of corn is dropped into the hopper by tilting the closure 56, as before described, the ear will be conducted by the fingers of the chain into the space between the drum 64—65, and there acted upon by the spurs and sockets to produce the husking action, as hereinafter explained.

At its forward end the shaft 19 is provided with a gear pinion 73 co-acting with a gear 74 upon a countershaft 75 which is mounted for rotation upon the lower end of the frame 10. The shafts 60—61 are provided at their forward ends with gear pinions 76—77 which engage with gear wheels 78—79 upon the shaft 75. By this means it will be obvious that the motion of the shaft 19 is imparted to the shafts 60—61, the drums 64—65, and the endless carrier 70.

Located upon the frame 10 at the lower end of the drums 64—65 is a shield 80 which extends over the gears 78—79 and protects the latter and conducts the husked and silked ears from the machine, as hereinafter explained. Supported upon the frame 10 beneath the severing, husking and silking mechanisms are drums 81 over which an endless belt of canvas or like material 82 is conducted.

Supported from the platform 43 are hangers 83 carrying a drum 101, while another drum 102 is carried by the frame 10 above one of the drums 81, the latter drum carrying an inclined carrier belt 103. The shaft of one of the drums 81 carries a cord pulley 104, while a similar cord pulley is carried by the shaft of the drum 102, the two cord pulleys being arranged to receive an endless cord 106 whereby the motion of the drums 81 are communicated to the belt 103.

The shaft 75 is provided with a chain wheel 107 over which a chain 108 leads to a chain wheel 109 on the shaft 98, whereby the motion is imparted to the chains 70. The shaft 98 is provided with a cord pulley 110 over which a cord belt 111 leads to a cord pulley 112 on the shaft of one of the drums 81, being conducted in its passage over idler guide pulleys 113, whereby motion is imparted to the belts 88 and 103. The belts 103 and 82 it will be noted operate to carry the husks and cut off ends away from the machine.

Extending over each of the drums 64 is a bar 89, one of the bars being shown in Fig. 7, and connected to the bar is a bent sheet metal plate formed in two curved portions 90—91, the part 90 extending toward the drum 65, while the part 91 extends over the opposite side of the drum 64 and in close proximity thereto. The lower edge of the portion 90 of the plate is extended to a point as low as possible consistent with the action of the spurs 67, while the portion 91 is preferably extended to engage in close contact with the drum. The two portions 90—91 thus serve as an effectual scraper to prevent the husks and the silk from engaging upon the rolls and clogging the same, and likewise to prevent the roll 64 from becoming gummed or clogged from the juices which may fall from the soft ears of corn. By this means the rollers are kept clear from obstruction and prevented from becoming clogged when in operation. The floor 95 is provided with a curved guide plate 92 to conduct the ears from the upper side of the carrier to the floor and thence to the hoppers.

Having thus described my invention, what is claimed as new is:

1. A supporting frame, an endless carrier upon said frame, stripping and silking devices associated with said carrier, said stripping and silking devices comprising rollers having spirally arranged spurs and sockets upon one portion and spirally arranged channels and brushes upon the remaining portions, a receiver for each of said stripping and silking devices, and means for conducting ears of corn consecutively from said carrier to said receivers.

2. A supporting frame, an endless carrier upon said frame, stripping and silking devices associated with said carrier, said stripping and silking devices comprising rollers having spirally arranged spurs and sockets upon one portion and spirally arranged channels and brushes upon the remaining portions, a receiver for each of said stripping and silking devices, means for conducting ears of corn consecutively from said carrier to said receivers, guard bars located above said rollers and extending longitudinally of the same, and a plate connected to one of said guard bars and extending into close relations to the adjacent roller at opposite sides of the center thereof and constituting a scraper to prevent the clogging of the rolls.

3. A supporting frame, stripping and silking devices associated with said frame, said stripping and silking devices comprising a pair of rollers, one of the rollers having spirally arranged spurs upon one portion and spirally arranged brushes upon the other portion, and the other roller having spirally arranged sockets to receive the spurs and a spirally arranged channel to receive the brushes, said spurs and sockets co-acting to strip the husks from the ears and the brushes and channel co-acting to remove the silk from the ears.

4. In an apparatus of the class described, a hopper for the ears to be stripped, a pair of rollers arranged to receive the ears from the hopper, one of the rollers having spirally arranged spurs upon one portion and spirally arranged brushes upon the other portion, and the other roller having spirally arranged sockets to receive the spurs and a spirally arranged channel to receive the brushes, and a flexible member having a plurality of lateral fingers spaced apart and mounted for movement above said rollers and operating to move the ears longitudinally of the same.

5. In an apparatus of the class described, a hopper for the ears to be stripped, a pair of rollers arranged to receive the ears from the hopper, one of the rollers having spirally arranged spurs upon one portion and spirally arranged brushes upon the other portion, and the other roller having spirally arranged sockets to receive the spurs and a spirally arranged channel to receive the brushes, a flexible member having a plurality of lateral fingers spaced apart and mounted for movement above said rollers and operating to move the ears longitudinally of the same, and a combined guard and scraper partially covering the roller having the sockets.

6. In an apparatus of the class described, a pair of stripping rolls arranged to receive the ears of corn, one of the rollers having spirally arranged spurs increasing in bluntness from the feed toward the discharge end, and the other roller having spirally arranged sockets to receive the spurs.

7. In an apparatus of the class described, a pair of stripping rollers arranged to receive the ears of corn, one of the rollers having spurs spaced apart and spirally arranged longitudinally thereof with the spur nearest to the feed end of the roller having a sharp point and the remaining spurs gradually decreasing in sharpness from the feed toward the discharge end, and the other roller having spirally arranged sockets to respectively receive the spurs.

In testimony whereof, I affix my signature in presence of two witnesses.

JOHN H. O'HARA. [L. S.]

Witnesses:
RAYMOND L. SMITH,
E. G. HANCE.